(12) United States Patent
Kim et al.

(10) Patent No.: US 10,305,131 B2
(45) Date of Patent: May 28, 2019

(54) ELECTROLYTE MEMBRANE FOR FUEL CELL COMPRISING POLYMER BLEND, AND MEMBRANE-ELECTRODE ASSEMBLY AND FUEL CELL COMPRISING THE SAME

(71) Applicants: YOULCHON CHEMICAL CO., LTD., Seoul (KR); KOREA INSTITUTE OF SCIENCE AND TECHNOLOGY, Seoul (KR)

(72) Inventors: Hyoung-Juhn Kim, Seoul (KR); Jong Hyun Jang, Seoul (KR); So Young Lee, Seoul (KR); Bohyun Kim, Seoul (KR); Sun-Hee Choi, Seoul (KR); Jonghee Han, Seoul (KR); Jin Ho Kim, Gunpo-si (KR); Jong Hyub Park, Ansan-si (KR)

(73) Assignees: YOULCHON CHEMICAL CO., LTD., Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 160 days.

(21) Appl. No.: 15/200,060

(22) Filed: Jul. 1, 2016

(65) Prior Publication Data

US 2017/0005353 A1    Jan. 5, 2017

(30) Foreign Application Priority Data

Jul. 3, 2015  (KR) .................. 10-2015-0095424

(51) Int. Cl.
*H01M 8/1027*  (2016.01)
*H01M 8/1044*  (2016.01)
(Continued)

(52) U.S. Cl.
CPC ......... *H01M 8/1027* (2013.01); *C08J 5/2256* (2013.01); *H01M 8/1044* (2013.01);
(Continued)

(58) Field of Classification Search
CPC ............. H01M 8/1027; H01M 8/1044; H01M 8/1081; H01M 8/1004; C08J 5/256; C08J 2381/06; C08J 2481/06
See application file for complete search history.

(56) References Cited

U.S. PATENT DOCUMENTS 8,445,141 B2    5/2013  Kitamura et al.
8,771,897 B2    7/2014  Kim et al.
(Continued)

FOREIGN PATENT DOCUMENTS

JP    2004263052 A     9/2004
JP    2006342252 A    12/2006
(Continued)

OTHER PUBLICATIONS

Zhuang Liu et al. "Synthesis of Novel poly(aryl ether sulfone)s Bearing Bulky Pendants for Gas Separation Membranes" Macromolecular Research, vol. 21, No. 6, 2013 (pp. 608-613).
(Continued)

*Primary Examiner* — Helen Oi K Conley
(74) *Attorney, Agent, or Firm* — Sughrue Mion, PLLC

(57) ABSTRACT

Disclosed is an electrolyte membrane for a fuel cell including a polymer blend of a sulfonated polyethersulfone copolymer, hydroxyl group-containing polyethersulfone copolymer and a hydroxyl group-containing sulfonated polyethersulfone copolymer.

34 Claims, 11 Drawing Sheets

(51) Int. Cl.
*H01M 8/1081* (2016.01)
*C08J 5/22* (2006.01)
*H01M 8/1004* (2016.01)
*H01M 8/1018* (2016.01)

(52) U.S. Cl.
CPC ....... *H01M 8/1081* (2013.01); *C08J 2381/06* (2013.01); *C08J 2481/06* (2013.01); *H01M 8/1004* (2013.01); *H01M 2008/1095* (2013.01); *H01M 2300/0082* (2013.01); *Y02P 70/56* (2015.11)

(56) References Cited

U.S. PATENT DOCUMENTS

| | | |
|---|---|---|
| 2008/0171252 A1 | 7/2008 | Hirano et al. |
| 2012/0237850 A1 | 9/2012 | Kim et al. |
| 2014/0329169 A1 | 11/2014 | Kim et al. |

FOREIGN PATENT DOCUMENTS

| | | |
|---|---|---|
| JP | 200756147 A | 3/2007 |
| JP | 2014218661 A | 11/2014 |
| KR | 10-1344686 B1 | 12/2013 |

OTHER PUBLICATIONS

Brian R. Einsla et al. "Synthesis and Characterization of Hydroxy-Functionalized Poly(arylene Ether Sulfone)s and Conversion to Proton Conducting Membranes for Fuel Cells" Prepr. Pap.-Am. Chem. Soc., Div. Fuel Chem. vol. 49, No. 2, 2004 (pp. 616-618).

M. Yoshikawa et al., "Modified Polysulfone Membranes II. Pervaporation of Aqueous Ethanol Solution through Modified Polysulfone Membranes Bearing Various Hydroxyl Groups," Polymer Journal, vol. 24, No. 10, pp. 1049-1055 (1992).

Y H Kwon et al., "Novel sulfonated poly(arylene ether sulfone) containing hydroxyl groups for enhanced proton exchange membrane properties," Polymer Chemistry, vol. 6, No. 2, 9 pages total (Jan. 14, 2015).

FIG. 2B

|  | 30 °C | 65 °C | 90 °C |
|---|---|---|---|
| BPS40 | 28.7 | 37.7 | 54.2 |
| BPS60 | 295.8 | 304.7 | 450.9 |
| blend60 (8-1-1) | 87.5 | 104.3 | 147.1 |
| blend60 (8-2-0) | 58.6 | 84.7 | 173.6 |
| blend60 (8-0-2) | 99.2 | 130.8 | 231.1 |
| blend60 (9-1-0) | 84.4 | 99.1 | 189.9 |
| blend60 (9-0-1) | 113.3 | 201.3 | 339.3 |
| NR212 | 14.42 | 22.18 | 31.05 |

ELECTROLYTE MEMBRANE FOR FUEL CELL COMPRISING POLYMER BLEND, AND MEMBRANE-ELECTRODE ASSEMBLY AND FUEL CELL COMPRISING THE SAME

CROSS-REFERENCE TO RELATED APPLICATION

This application claims priority to Korean Patent Application No. 10-2015-0095424, filed on Jul. 3, 2015, and all the benefits accruing therefrom under 35 U.S.C. § 119, the contents of which in its entirety are herein incorporated by reference.

BACKGROUND

1. Field

The present disclosure relates to an electrolyte membrane for a fuel cell including a polymer blend, and a membrane-electrode assembly and a fuel cell including the same.

2. Description of the Related Art

Fuel cells may be classified into solid oxide fuel cells (SOFC), polymer electrolyte membrane fuel cells (PEMFC), phosphoric acid fuel cells (PAFC), molten carbonate fuel cells (MCFC), alkaline fuel cells (AFC), or the like, depending on type of electrolyte used therein.

In general, properties required for an electrolyte membrane for a polymer electrolyte membrane fuel cell include high proton conductivity, excellent mechanical strength, low fuel permeability, high dimensional stability, high inert property, low cost, or the like. Although a Nafion type perfluorosulfonated polymer membrane used frequently as an electrolyte membrane for a polymer electrolyte fuel cell has high proton conductivity, high inert property and excellent mechanical properties, it shows high fuel permeability, low proton conductivity under a low-humidity high-temperature condition, high cost and poor cost efficiency.

Under these circumstances, intensive studies have been conducted about a hydrocarbon-based cation exchange membrane and a partially fluorinated cation exchange membrane. Some examples of such cation exchange membranes include sulfonated poly(phenylene oxide)-based, poly(phenylene sulfide)-based, polysulfone-based, poly(para-phenylene)-based, polystyrene-based, polyetherether ketone-based, polyarylene ether sulfone-based and polyimide-based polymers. A low-molecular weight sulfonated polyarylene ether sulfone-based polymer having a high sulfonation degree has relatively high solubility to water and low dimensional stability, and thus may not show long-term stability like that of the above-mentioned perfluorinated sulfonated polymer membrane.

REFERENCES

Patent Documents

Korean Patent Publication No. 10-1344686

SUMMARY

The present disclosure is directed to providing an electrolyte membrane having high proton conductivity and excellent mechanical strength and dimensional stability.

The present disclosure is also directed to providing an electrolyte membrane having excellent long-term stability.

In addition, the present disclosure is directed to providing an electrolyte membrane having high proton conductivity under a low-humidity condition.

Further, the present disclosure is directed to providing an electrolyte membrane that shows high proton conductivity under a high-temperature low-humidity condition and may be obtained by a cost-efficient method.

In one aspect, there is provided an electrolyte membrane for a fuel cell including a polymer blend of a sulfonated polyethersulfone copolymer, hydroxyl group-containing polyethersulfone copolymer and a hydroxyl group-containing sulfonated polyethersulfone copolymer.

In another aspect, there is provided a membrane-electrode assembly including the electrolyte membrane for a fuel cell.

In still another aspect, there is provided a fuel cell including the electrolyte membrane for a fuel cell.

According to the present disclosure, it is possible to provide an electrolyte membrane having high proton conductivity and excellent mechanical strength and dimensional stability.

According to the present disclosure, it is possible to provide an electrolyte membrane having excellent long-term stability.

In addition, according to the present disclosure, it is possible to provide an electrolyte membrane having high proton conductivity under a low-humidity condition.

Further, according to the present disclosure, it is possible to provide an electrolyte membrane that shows high proton conductivity under a high-temperature low-humidity condition and may be obtained by a cost-efficient method.

BRIEF DESCRIPTION OF THE DRAWINGS

FIG. 2B is a table showing the moisture content of the electrolyte membranes according to Example and Comparative Example.

DETAILED DESCRIPTION

Figure 1:
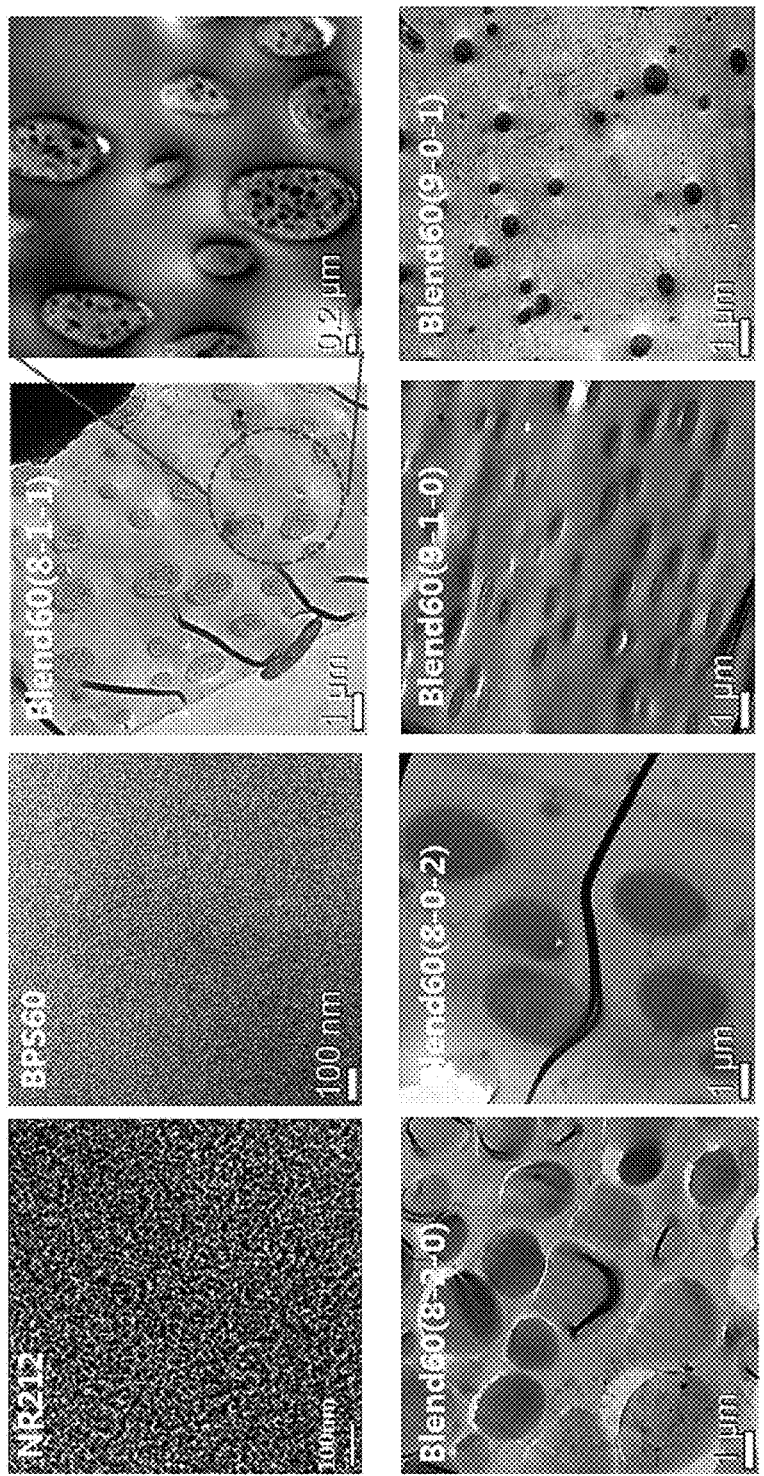
FIG. 1 is a transmission electron microscopic (TEM) image of the electrolyte membranes according to Example and Comparative Example.
Figure 2A:
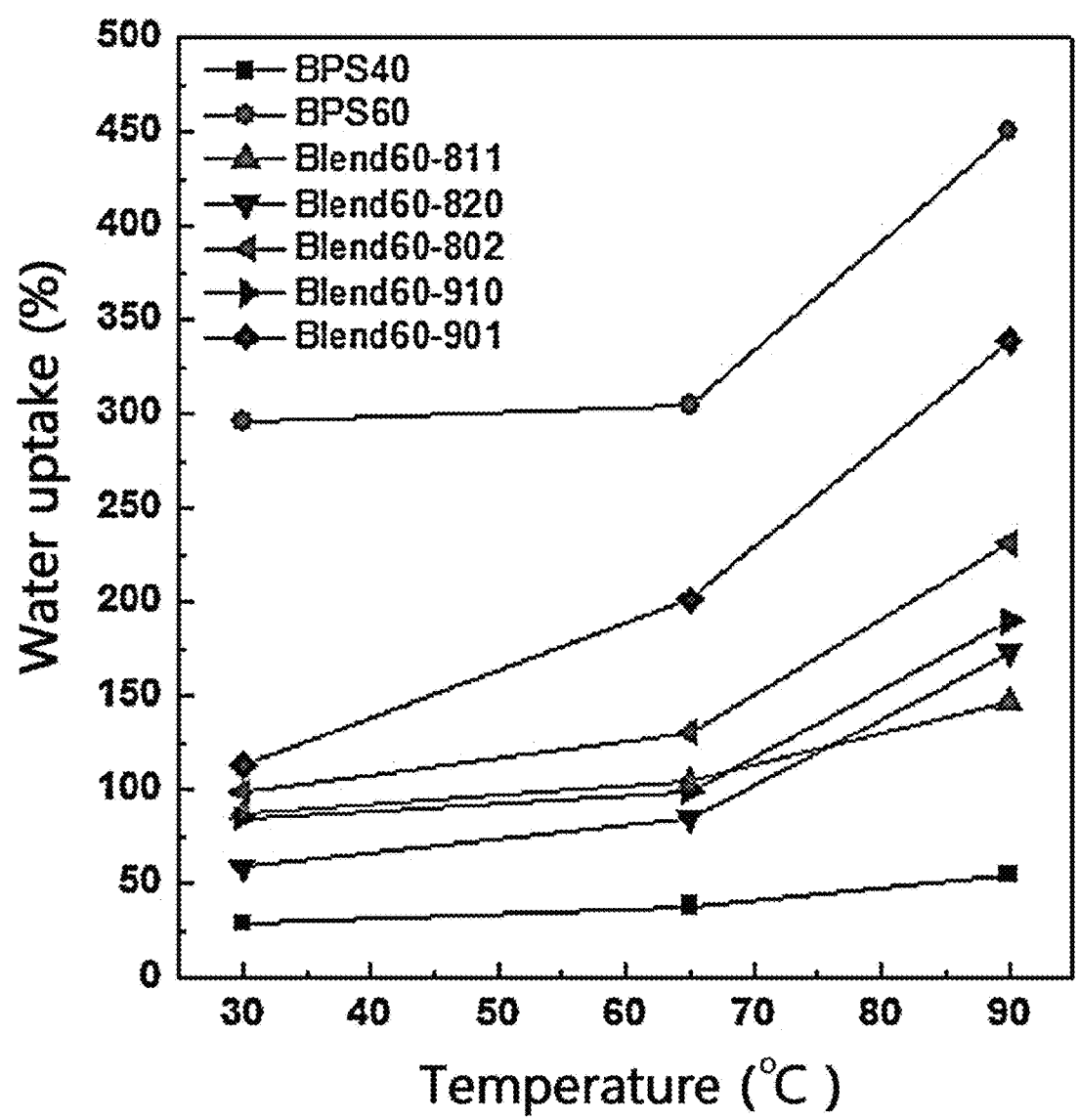
FIG. 2A is a graph illustrating the moisture content of the electrolyte membranes according to Example and Comparative Example.
Figure 3A:
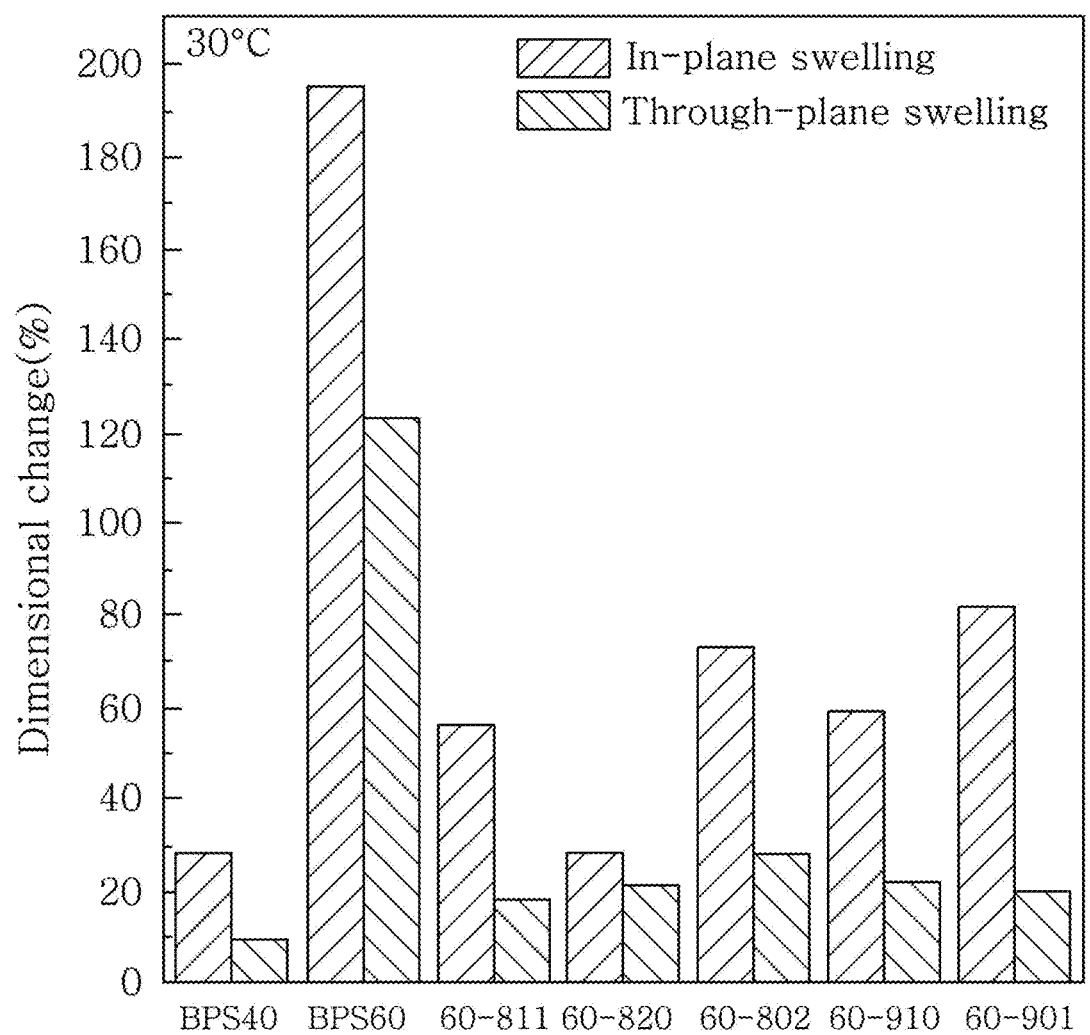
FIG. 3A is a graph illustrating the variation in dimension of the electrolyte membranes according to Example and Comparative Example at 30° C.
Figure 3B:
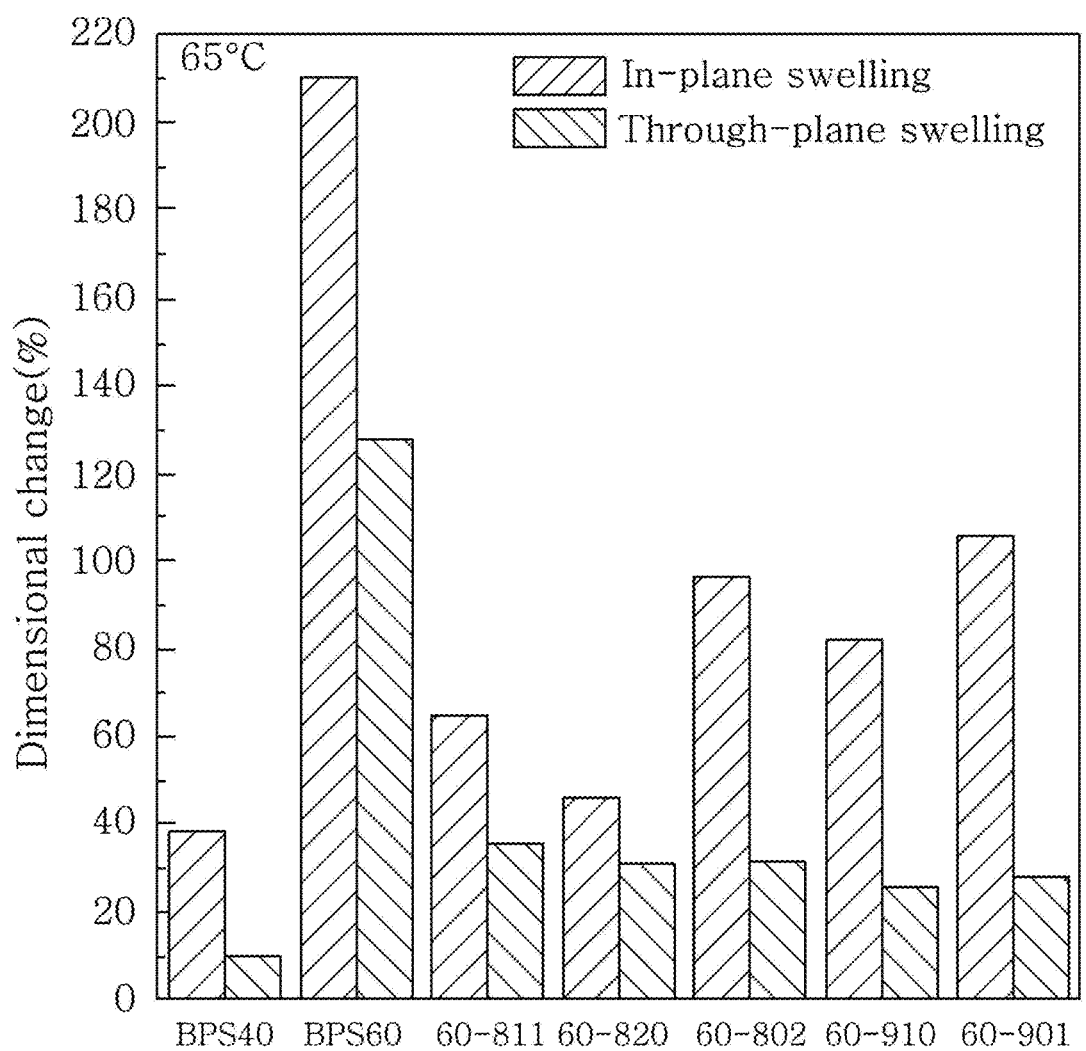
FIG. 3B is a graph illustrating the variation in dimension of the electrolyte membranes according to Example and Comparative Example at 65° C.
Figure 3C:
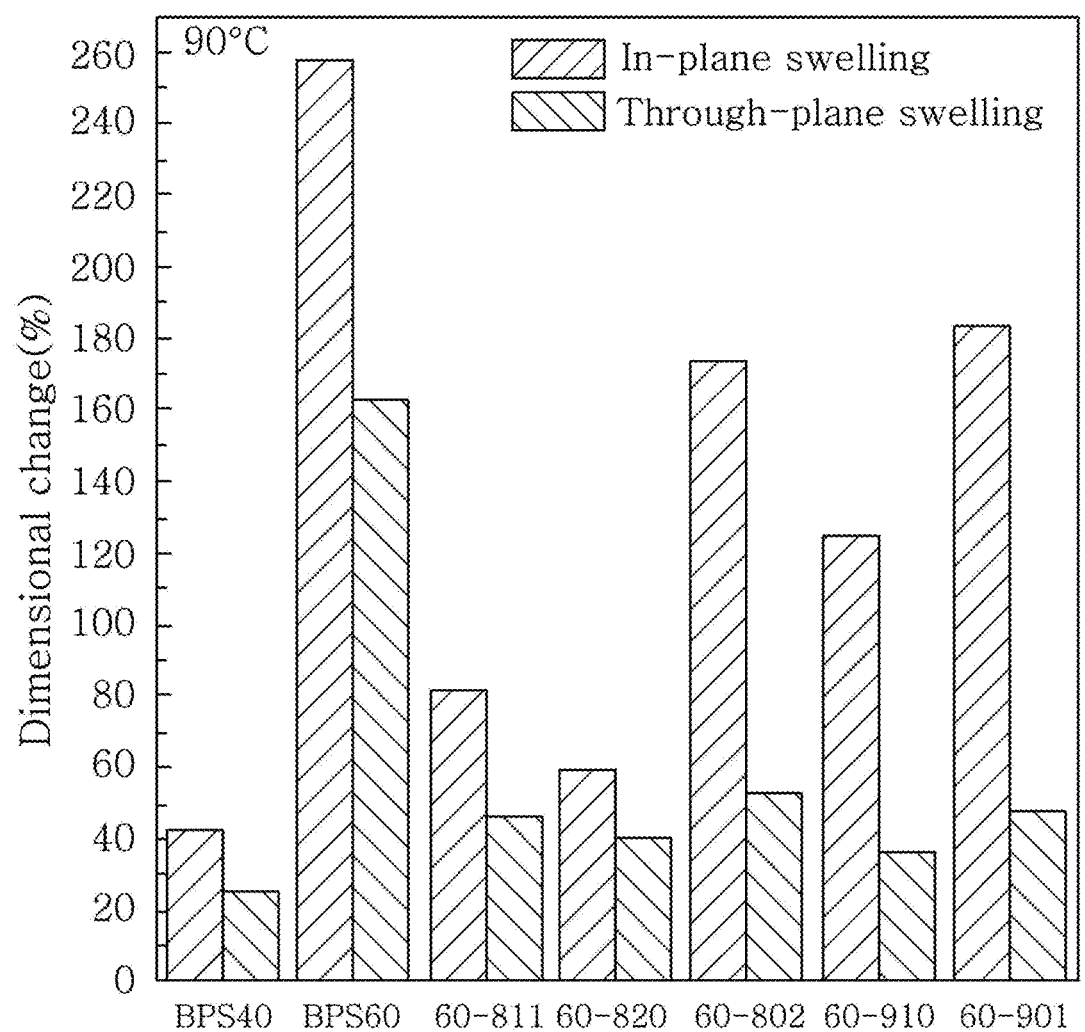
FIG. 3C is a graph illustrating the variation in dimension of the electrolyte membranes according to Example and Comparative Example at 90° C.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the drawings, the shape, size and regions, and the like, of the drawing may be exaggerated for clarity. In addition, many modifications can be made by those skilled in the art to adapt a particular situation or material to the teachings of the present disclosure without departing from the essential scope thereof.

As used herein, 'sulfonation degree' means a degree of substitution of the side chain of a copolymer with a sulfonate group, and may be the value of the ratio of 'a' in the repeating units of the following Chemical Formula 1, expressed in percentage.

As used herein, 'hydroxylation degree' means a degree of hydroxylation of the side chain of a copolymer with a hydroxyl group, and may be the value of the ratio of 'b' in the repeating units of the following Chemical Formula 2, expressed in percentage.

As used herein, a sulfonated copolymer or sulfonated polyether sulfone copolymer means a copolymer whose backbone is partially or totally substituted with a sulfonate group, and the backbone includes no hydroxyl group.

As used herein, a hydroxyl group-containing copolymer or hydroxyl group-containing polyethersulfone copolymer means a copolymer whose backbone is partially or totally substituted with a hydroxyl group, and the backbone includes no sulfonate group.

As used herein, a hydroxyl group-containing sulfonated copolymer or hydroxyl group-containing sulfonated polyethersulfone copolymer means a copolymer whose backbone is partially or totally substituted with a sulfonate group and hydroxyl group so that it may include both a sulfonate group and a hydroxyl group.

The electrolyte membrane for a fuel cell according to an embodiment of the present disclosure may include a polymer blend. The polymer blend may be a blend of a sulfonated copolymer, hydroxyl group-containing copolymer and a hydroxyl group-containing sulfonated copolymer.

The sulfonated copolymer may have a sulfonation degree of at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 24%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49% or at least 50%, and at most 95%, at most 94%, at most 93%, at most 92%, at most 91%, at most 90%, at most 89%, at most 88%, at most 87%, at most 86%, at most 85%, at most 84%, at most 83%, at most 82%, at most 81%, at most 80%, at most 79%, at most 78%, at most 77%, at most 76%, at most 75%, at most 74%, at most 73%, at most 72%, at most 71%, at most 70%, at most 69%, at most 68%, at most 67%, at most 66%, at most 65%, at most 64%, at most 63%, at most 62%, at most 61%, at most 60%, at most 59%, at most 58%, at most 57%, at most 56%, at most 55%, at most 54%, at most 53%, at most 52%, at most 51% or at most 50%. For example, the sulfonated copolymer may have a sulfonation degree of 10%-95%, particularly 30%-70%, more particularly 40%-60%. Within the above-defined range, the electrolyte membrane may have high proton conductivity and excellent dimensional stability.

The sulfonated copolymer may be a sulfonated hydrocarbon-based copolymer selected from a sulfonated polyethersulfone-based copolymer, polythiosulfone-based copolymer, polyetheretherketone-based copolymer, polyimide-based copolymer, polystyrene-based copolymer and polyphosphazene-based copolymer. For example, the sulfonated copolymer may be a sulfonated polyethersulfone-based copolymer. The electrolyte membrane according to the present disclosure may provide high conductivity, since it includes the sulfonated copolymer.

According to an embodiment, the sulfonated copolymer may be a poly(arylene ether sulfone)-based block copolymer or random copolymer. For example, the sulfonated copolymer may be a poly(arylene ether sulfone)-based block copolymer or random copolymer, particularly random copolymer, including the repeating unit represented by the following Chemical Formula 1:

[Chemical Formula 1]

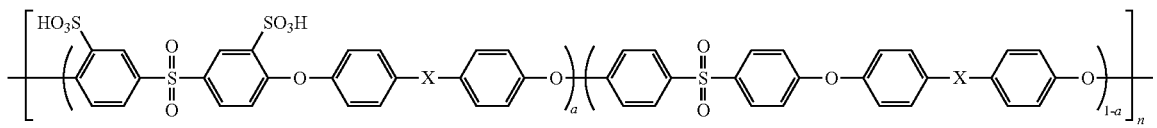

wherein X is O, S, C(=O), C(=O)NH, Si(CH$_3$)$_2$, (CH$_2$)$_p$, (CF$_2$)$_q$, C(CH$_3$)$_2$, C(CF$_3$)$_2$ or C(CH$_3$)(CF$_3$), each of p and q is an integer of 1-10, a is 0.1-0.95, and n is a polymerization degree of polymer which increases in proportion to the molecular weight of a copolymer.

According to another embodiment, the sulfonated copolymer may be obtained by polymerizing a non-sulfonated copolymer or copolymer having a low sulfonation degree and carrying out additional sulfonation, or by polymerizing a sulfonated copolymer with a sulfonated monomer, but is not limited thereto.

For example, the sulfonated copolymer may be obtained by carrying out condensation of at least one sulfonate group-containing monomer and at least one monomer containing no sulfonate group at a predetermined molar ratio, but is not limited thereto. The sulfonate group-containing monomer or the monomer containing no sulfonate group may be selected from 4-fluorophenylsulfone, 4,4'-dichlorobiphenylsulfone, bis(4-fluoro-3-sulfophenyl)sulfonate, 4,4-biphenol and 4,4'-dihydroxybiphenol, but is not limited thereto.

The sulfonated copolymer may be present in the polymer blend in an amount of at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt % or at least 85 wt %, and less than 100 wt %, at most 95 wt %, at most 90 wt %, at most 85 wt %, at most 80 wt % or at most 75 wt %, based on the total weight of the polymer blend. For example, the sulfonated copolymer may be present in an amount of 10 wt % or more and less than 100 wt %. The amount of the sulfonated copolymer may be adjusted depending on sulfonation degree of the copolymer. For example, when the sulfonated copolymer has a sulfonation degree of 40%-60%, the sulfonated copolymer may be present in the polymer blend in an amount of at least 50 wt %, at least 55 wt %, at least 60 wt %, at least 65 wt %, at least 70 wt %, at least 75 wt %, at least 80 wt % or at least 85 wt % and less than 100 wt %, at most 95 wt %, at most 90 wt %, at most 85 wt %, at most 80 wt %, at most 75 wt %, at most 70 wt % or at most 65 wt % or less, based on the total weight of the polymer blend. For example, the sulfonated copolymer may be present in an amount of at least 50 wt % and less than 100 wt %. Within the above-defined range, the electrolyte membrane may have excellent proton conductivity, high dimensional stability and excellent long-term stability.

The hydroxyl group-containing copolymer may have a hydroxylation degree of at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59% or at least 60%, and at most 90%, at most 89%, at most 88%, at most 87%, at most 86%, at most 85%, at most 84%, at most 83%, at most 82%, at most 81%, at most 80%, at most 79%, at most 78%, at most 77%, at most 76%, at most 75%, at most 74%, at most 73%, at most 72%, at most 71%, at most 70%, at most 69%, at most 68%, at most 67%, at most 66%, at most 65%, at most 64%, at most 63%, at most 62%, at most 61% or at most 60%. For example, the hydroxyl group-containing copolymer may have a hydroxylation degree of 5%-90%, particularly 50%-80%. Within the above-defined range, the electrolyte membrane may provide excellent mechanical strength and high dimensional stability, and may show excellent proton conductivity under a broad range of humidity conditions, for example, ranging from a high humidity of at least 80% RH or at least 90% RH to a low humidity of at most 60% RH or at most 50% RH.

The hydroxyl group-containing copolymer may be a hydrocarbon-based copolymer selected from a polyethersulfone-based copolymer, polythiosulfone-based copolymer, polyetheretherketone-based copolymer, polyimide-based copolymer, polystyrene-based copolymer and polyphosphazene-based copolymer, which has hydroxyl group. For example, the hydroxyl group-containing copolymer may be a polyethersulfone-based copolymer having hydroxyl group. The electrolyte membrane according to the present disclosure may provide high proton conductivity and excellent mechanical strength and dimensional stability by virtue of the hydroxyl group of the hydroxyl group-containing copolymer.

According to an embodiment, the hydroxyl group-containing copolymer may be a poly(arylene ether sulfone)-based block copolymer or random copolymer having hydroxyl group. For example, the hydroxyl group-containing copolymer may be a poly(arylene ether sulfone)-based block copolymer or random copolymer having hydroxyl group, particularly random copolymer, including the repeating unit represented by the following Chemical Formula 2:

[Chemical Formula 2]

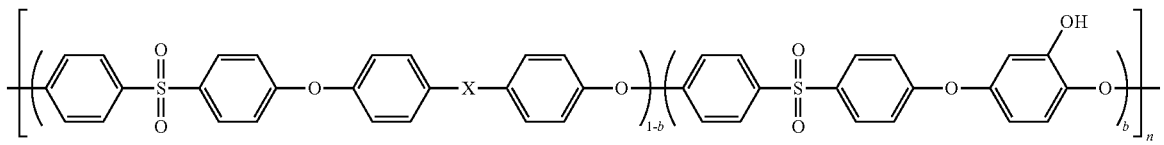

wherein X is O, S, C(=O), C(=O)NH, Si(CH$_3$)$_2$, (CH$_2$)$_p$, (CF$_2$)$_q$, C(CH$_3$)$_2$, C(CF$_3$)$_2$ or C(CH$_3$)(CF$_3$), each of p and q is an integer of 1-10, b is 0.05-0.9, and n is a polymerization degree of polymer which increases in proportion to the molecular weight of a copolymer.

According to still another embodiment, the hydroxyl group-containing copolymer may be obtained by polymerizing a copolymer containing no hydroxyl group and carrying out additional hydroxylation, or by polymerizing a hydroxyl group-containing copolymer with a hydroxyl group-containing monomer, but is not limited thereto.

According to a particular embodiment, the hydroxyl group-containing copolymer may be obtained by carrying out condensation of a monomer mixture containing alkoxy group-containing monomers at a predetermined molar ratio and substituting the alkoxy group with a hydroxyl group, but is not limited thereto.

The monomer mixture may include a monomer selected from 4-fluorophenylsulfone, 4,4'-dichlorobiphenylsulfone, 4,4'-dihydroxybiphenol and alkoxyhydroquinone, but is not limited thereto. For example, the alkoxyhydroquinone may be selected from methoxyhydroquinone, ethoxyhydroquinone, n-propoxyhydroquinone, isopropoxyhydroquinone, n-butoxyhydroquinone, isobutoxyhydroquinone and tert-butoxyhydroquinone, but is not limited thereto.

Substitution of the alkoxy group with a hydroxyl group may be carried out by dealkylation using a dealkylating agent, but is not limited thereto. For example, the dealkylating agent may be a strong Lewis acid, such as boron trichloride or boron tribromide, or hydrogen halide, such as HF, HI, HBr or HI.

According to a particular embodiment, the hydroxyl group-containing copolymer may be present in the polymer blend in an amount of more than 0 wt %, at least 0.1 wt %, at least 0.2 wt %, at least 0.3 wt %, at least 0.4 wt %, at least 0.5 wt %, at least 0.6 wt %, at least 0.7 wt %, at least 0.8 wt %, at least 0.9 wt %, at least 1 wt %, at least 2 wt %, at least 3 wt %, at least 4 wt %, at least 5 wt %, at least 6 wt %, at least 7 wt %, at least 8 wt %, at least 9 wt % or at least 10 wt %, and less than 50 wt %, at most 45 wt %, at most 40 wt %, at most 35 wt %, at most 30 wt %, at most 25 wt % or at most 20 wt %. For example, the hydroxyl group-containing copolymer may be present in an amount more than 0 wt % and less than 50 wt %, particularly at least 0.5 wt % and at most 40 wt %, more particularly at least 5 wt % and at most 30 wt %. Within the above-defined range, the electrolyte membrane may have excellent proton conductivity and excellent mechanical strength and dimensional stability.

According to still another embodiment, the amount of the hydroxyl group-containing copolymer may be adjusted depending on hydroxylation degree of copolymer. For example, when the hydroxyl group-containing copolymer has a hydroxylation degree more than 0% and at most 10%, the amount of the hydroxyl group-containing copolymer may be more than 0 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt % or at least 60 wt %, and at most 90 wt %, at most 85 wt %, at most 80 wt %, at most 75 wt %, at most 70 wt % or at most 65 wt %, particularly more than 0 wt % and at most 90 wt %.

The hydroxyl group-containing sulfonated polyethersulfone copolymer may be a copolymer having a hydroxyl group and sulfonate group in its backbone. The hydroxyl group-containing sulfonated polyethesulfone copolymer improves compatibility between the sulfonated copolymer and the hydroxyl group-containing copolymer, provides excellent proton conductivity and mechanical strength, and improves long-term stability. The copolymer may have a sulfonation degree of 10%-95% and a hydroxylation degree of 5%-90%. The sulfonation degree and hydroxylation degree may be the same as described above with reference to the sulfonated copolymer and hydroxyl group-containing copolymer. For example, the copolymer may have a sulfonation degree of 30%-50% and a hydroxylation degree of 30%-50%, particularly a sulfonation degree of 40% and a hydroxylation degree of 40%. Within the above-defined range, it is possible to increase compatibility between the sulfonated copolymer and the hydroxyl group-containing copolymer and to provide excellent proton conductivity and mechanical strength.

The hydroxyl group-containing sulfonated copolymer may be a sulfonated hydrocarbon-based copolymer selected from a sulfonated polyethersulfone-based copolymer, polythiosulfone-based copolymer, polyetheretherketone-based copolymer, polyimide-based copolymer, polystyrene-based copolymer and polyphosphazene-based copolymer which has hydroxyl group. For example, the hydroxyl group-containing sulfonated copolymer may be a sulfonated polyethersulfone-based copolymer copolymer having hydroxyl group.

Particularly, the hydroxyl group-containing sulfonated copolymer may be a poly(arylene ether sulfone)-based block copolymer or random copolymer copolymer having hydroxyl group. For example, the hydroxyl group-containing sulfonated copolymer may be a poly(arylene ether sulfone)-based block copolymer or random copolymer copolymer having hydroxyl group, particularly random copolymer, including the repeating unit represented by the following Chemical Formula 3:

[Chemical Formula 3]

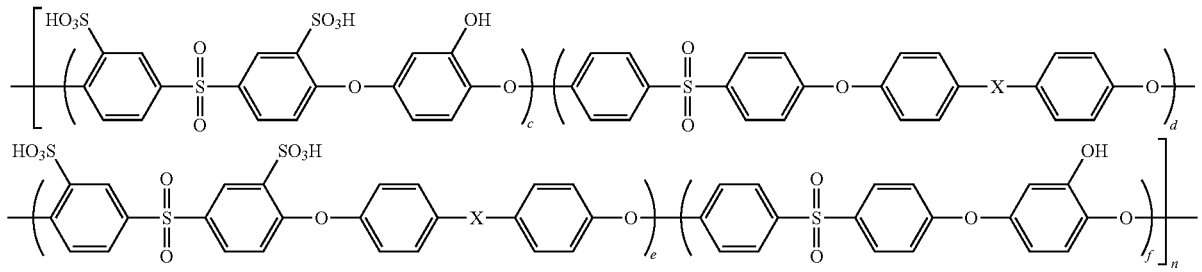

wherein X is O, S, C(=O), C(=O)NH, Si(CH$_3$)$_2$, (CH$_2$)$_p$, (CF$_2$)$_q$, C(CH$_3$)$_2$, C(CF$_3$)$_2$ or C(CH$_3$)(CF$_3$), each of p and q is an integer of 1-10, each of c, d, e and f corresponds to the molar ratio of the monomers for polycondensation, and n is a polymerization degree of polymer which increases in proportion to the molecular weight of a copolymer.

Particularly, the hydroxyl group-containing sulfonated copolymer may be obtained by forming an alkoxy group-containing sulfonated copolymer, substituting the sulfonate group of the alkoxy group-containing sulfonated copolymer with a sulfonyl chloride group, substituting the alkoxy group with a hydroxyl group, and hydrolyzing the sulfonyl chloride group so that it is reduced into a sulfonate group, but is not limited thereto.

For example, the alkoxy group-containing sulfonated copolymer may be obtained by carrying out condensation of a monomer selected from bis(4-fluoro-3-sulfophenyl)sulfonate, 4,4'-dichlorobiphenylsulfone, 4-flurophenylsulfone, 4,4'-dihydroxybiphenol and alkoxyhydroquinone, but is not limited thereto.

The sulfonate group may be substituted with a sulfonyl chloride group through the reaction with thionyl chloride in the presence of a catalyst, but is not limited thereto.

The alkoxy group may be substituted with a hydroxyl group through dealkylation using a dealkylating agent, but is not limited thereto. Particular examples of the dealkylating agent may include a strong Lewis acid, such as boron trichloride or boron tribromide, or hydrogen halide, such as HF, HI, HBr or HI.

Reduction of sulfonyl chloride into a sulfonate group may be carried out by dipping the reactant into an acid solution, such as diluted hydrosulfuric acid or diluted hydrochloric acid solution, but is not limited thereto.

The hydroxyl group-containing sulfonated copolymer may be present in the polymer blend in an amount of more than 0 wt %, at least 0.1 wt %, at least 0.2 wt %, at least 0.3 wt %, at least 0.4 wt %, at least 0.5 wt %, at least 0.6 wt %, at least 0.7 wt %, at least 0.8 wt %, at least 0.9 wt %, at least 1 wt %, at least 2 wt %, at least 3 wt %, at least 4 wt %, at least 5 wt %, at least 6 wt %, at least 7 wt %, at least 8 wt %, at least 9 wt % or at least 10 wt %, and less than 50 wt %, at most 45 wt %, at most 40 wt %, at most 35 wt %, at most 30 wt %, at most 25 wt % or at most 20 wt %, based on the total weight of the polymer blend. For example, the hydroxyl group-containing sulfonated copolymer may be present in an amount more than 0 wt % and less than 50 wt %, particularly at least 0.5 wt % and at most 40 wt %, more particularly at least 5 wt % and at most 30 wt %. Within the above-defined range, it is possible to improve compatibility between the copolymers and to provide excellent proton conductivity and mechanical strength.

According to a particular embodiment, the polymer blend may include (a) sulfonated copolymer, (b) hydroxyl-group containing copolymer and (c) hydroxyl group-containing sulfonated copolymer at a weight ratio (a):(b):(c) of 5-9: 0.5-4:0.5-4, particularly 6-8:1-2:1-2. Within the above-defined range, the electrolyte membrane may have excellent long-term stability, high mechanical strength, excellent dimensional stability and high proton conductivity.

The weight ratio (a):(b):(c) may be adjusted depending on sulfonation degree (DSa) of the sulfonated copolymer. For example, when DSa is 40%, the weight ratio may be 6:2:2. When DSa is 50%, the weight ratio may be 7:2:1. In addition, when DSa is 60%, the weight ratio may be 8:1:1. Within the above defined range, the electrolyte membrane may have improved long-term stability, mechanical strength and dimensional stability and high proton conductivity.

The examples, comparative examples and experiments will now be described. It is apparent to those skilled in the art that the following examples, comparative examples and experiments are for illustrative purposes only and not intended to limit the scope of the present disclosure.

Preparation Example 1. Preparation of Sulfonated Copolymer (Sulfonation Degree 40%)

As shown in the following Reaction Scheme 1, in a 250 mL four-neck flask, 3,3'-disulfonated-4,4'-dichlorodiphenylsulfone (1.9650 g, 4 mmol), 4,4'-dichloro diphenylsulfone (1.7230 g, 6 mmol) and 4,4'-dihydroxylbiphenol (1.8809 g, 10 mmol) as monomers and 1.67 g of $K_2CO_3$ are dispersed into 22 mL of a mixed solvent containing 11 mL of toluene and 22 mL of dimethylacetamide (DMAc) under argon gas atmosphere. Then, the reaction materials are heated by a Dean-Stark distillation system to 140° C. for 5 hours under reflux. After that, toluene is removed by simple distillation and the remaining reaction mixture is allowed to react at 160° C. for 20 hours under argon gas atmosphere. The resultant copolymer solution is dipped into a 7:3 mixture of isopropyl alcohol with distilled water, filtered and dried in a vacuum oven at 120° C. for 24 hours to obtain a sulfonated copolymer having a sulfonation degree of 40%.

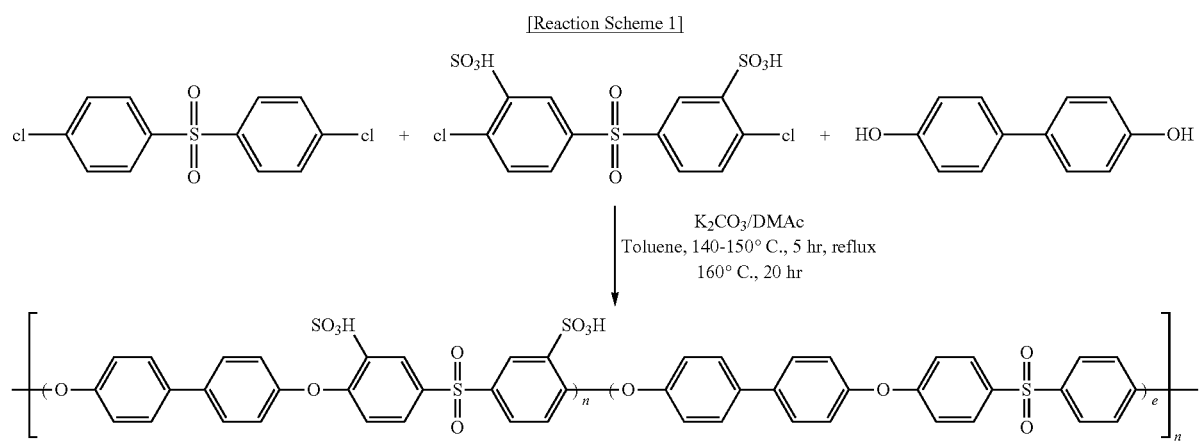

[Reaction Scheme 1]

The electrolyte membrane for a fuel cell according to the embodiments of the present disclosure uses a blend of the above-mentioned three types of copolymers, and thus shows excellent dimensional stability, mechanical strength and long-term stability, even when the sulfonated copolymer has a high sulfonation degree of at least 30%, at least 40%, at least 50% or at least 60%.

The electrolyte membrane for a fuel cell according to the embodiments of the present disclosure may be used for a membrane-electrode assembly for a fuel cell. For example, the electrolyte membrane for a fuel cell according to the embodiments of the present disclosure may be disposed between an anode and cathode to provide a membrane-electrode assembly for a fuel cell, which, in turn, may be incorporated to a fuel cell.

The membrane-electrode assembly according to an embodiment of the present disclosure may include the electrolyte membrane for a fuel cell according to an embodiment of the present disclosure.

The fuel cell according to an embodiment of the present disclosure may include the electrolyte membrane for a fuel cell according to an embodiment of the present disclosure.

Preparation Examples 2-3. Preparation of Sulfonated Copolymers (Sulfonation Degree 50%, 60%)

Sulfonated copolymers are obtained in the same manner as Preparation Example 1, except that the amounts of monomers are changed as shown in the following Table 1 to obtain a sulfonated copolymer having a sulfonation degree of 50% and a sulfonated copolymer having a sulfonation degree of 60%.

TABLE 1

|  | Prep. Ex. 1 (Sulfonation degree 40%) | Prep. Ex. 2 (Sulfonation degree 50%) | Prep. Ex. 3 (Sulfonation degree 60%) |
| --- | --- | --- | --- |
| 3,3'-disulfonated-4,4'-dichlorodiphenylsulfone | 4 mmol | 5 mmol | 6 mmol |
| 4,4'-dichlorodiphenylsulfone | 6 mmol | 5 mmol | 4 mmol |
| 4,4'-dihydroxybiphenol | 10 mmol | 10 mmol | 10 mmol |

Preparation Example 4. Preparation of Hydroxyl Group-Containing Copolymer 4-1. Synthesis of Methoxy Group-Containing Poly (Arylene Ether Sulfone) Random Copolymer As shown in the following Reaction Scheme 2, in a 250 mL four-neck flask, 4,4'-dichlorodiphenylsulfone (2.871 g, 10 mmol), methoxyhydroquinone (0.841 g, 6 mmol) and 4,4'-dihydroxylbiphenol (0.752 g, 10 mmol) as monomers and 1.67 g of $K_2CO_3$ are dispersed into 22 mL of a mixed solvent containing 11 mL of toluene and 22 mL of N-methyll-2-pyrrolidone (NMP) under argon gas atmosphere. Then, the reaction materials are heated by a Dean-Stark distillation system to 140° C. for 3 hours under reflux. After that, toluene is removed by simple distillation and the remaining reaction mixture is allowed to react at 190° C. for 3 hours under argon gas atmosphere. The resultant copolymer solution is dipped into a 7:3 mixture of isopropyl alcohol with distilled water, filtered and dried in a vacuum oven at 120° C. for 24 hours to obtain a methoxy group-containing poly(arylene ether sulfone) random copolymer (BPS-Me).

Preparation Example 5. Preparation of Hydroxyl Group-Containing Sulfonated Copolymer According to the following Reaction Scheme 3, a hydroxyl group-containing sulfonated copolymer is obtained.

5-1. Synthesis of Methoxy Group-Containing Sulfonated Poly(Arylene Ether sulfone) Random Copolymer In a 250 mL four-neck flask, 3,3'-disulfonated-4,4'-dichlorodipheynylsulfone (1.9650 g, 4 mmol), 4,4'-dichlorodiphenylsulfone (1.7230 g, 6 mmol), methoxy hydroquinone (0.5605 g, 4 mmol) and 4,4'-dihydroxylbiphenol (1.3697 g, 6 mmol) as monomers and 2.32 g of $K_2CO_3$ are dispersed into 22 mL of a mixed solvent containing 11 mL of toluene and 22 mL of dimethylacetamide (DMAc) under argon gas atmosphere. Then, the reaction materials are heated by a Dean-Stark distillation system to 140° C. for 5 hours under reflux. After that, toluene is removed by simple distillation and the remaining reaction mixture is allowed to react at 160° C. for 20 hours under argon gas atmosphere. The

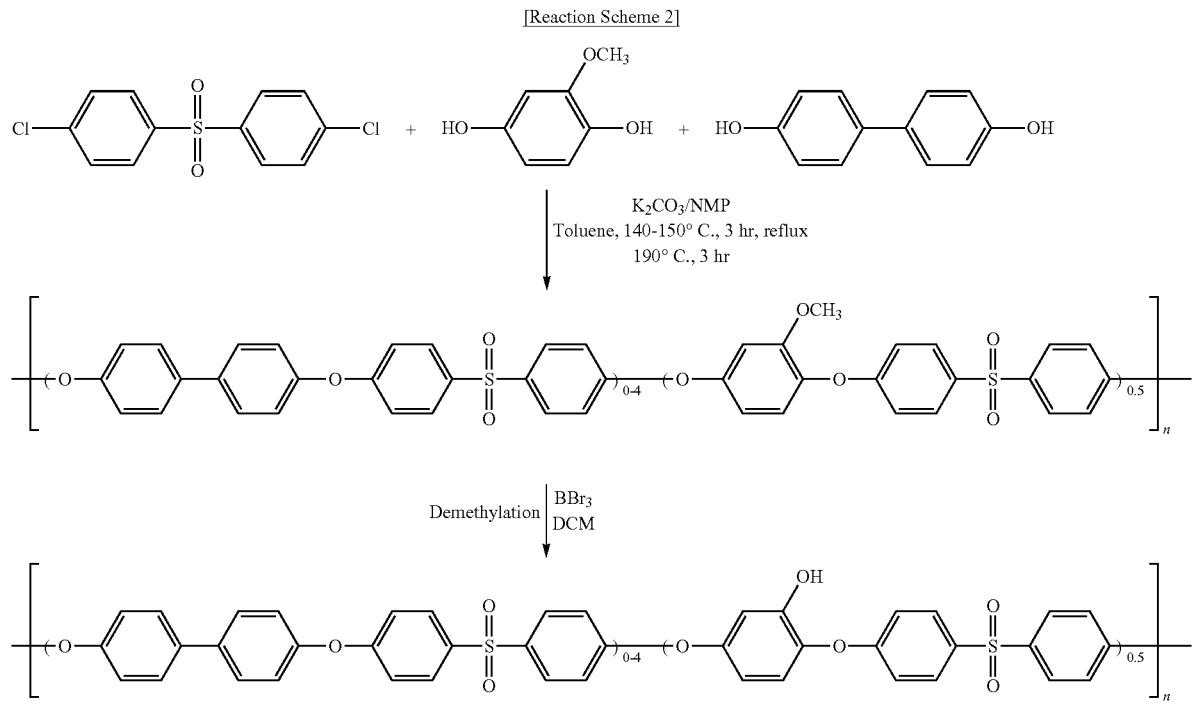

4-2. Substitution of Methoxy Group of Methoxy Group-Containing Copolymer (BPS-Me) with Hydroxyl Group In a 50 mL three-necked flask under argon gas atmosphere, 1.0 g of the methoxy group-containing copolymer (BPS-Me) obtained from 4-1 and 40 mL of dichloromethane (DCM) as a solvent are added. Next, the reactor is immersed in a cooling bath so that the external temperature of the reactor may be 0° C. Under this condition, 7 mL of 1.0M $BBr_3$ solution is added dropwise thereto by using a syringe. After the completion of the addition of the $BBR_3$ solution, reaction is carried out for 6 hours to perform demethylation. Then, the reaction mixture is filtered without dipping, washed with distilled water many times, filtered and dried in a vacuum oven at 60° C. for 24 hours to obtain a hydroxyl group-containing copolymer. The resultant copolymer has a hydroxylation degree of 60%.

resultant copolymer solution is dipped into a 7:3 mixture of isopropyl alcohol with distilled water, filtered and dried in a vacuum oven at 80° C. for 24 hours to obtain a methoxy group-containing sulfonated poly(arylene ether sulfone) random copolymer (SPAES-Me). The copolymer has a sulfonation degree of 40%.

5-2. Substitution of Sulfonate Groups of Methoxy Group-Containing Sulfonated Copolymer (SPAES-Me) with Sulfonyl Chloride Group To a 50 mL two-necked flask, 2.0 g of the methoxy group-containing sulfonated copolymer (SPAES-Me) obtained from 5-1 and 250 mL of thionyl chloride are added under argon gas atmosphere. To the reactor, 4 mL of N,N-dimethylformamide (DMF) is introduced as a catalyst and the reactor is warmed to 60° C. to carry out reaction for 4 hours. Then, the reactor is warmed to 95° C. and to carry out extraction of at least 80% of thionyl chloride. The copolymer solution remaining in the reactor is cooled to room temperature and 20 mL of tetrahydrofuran (THF) is introduced thereto to form a diluted copolymer solution, which, in turn, is dipped into isopropyl alcohol. After filtering, the reaction product is dried in a vacuum oven at 60° C. to obtain a methoxy group-containing copolymer (BPSCl-Me) having a sulfonyl chloride group.

5-3. Substitution of Methoxy Group with Hydroxyl Group

In a 50 mL three-necked flask under argon gas atmosphere, 1.0 g of the methoxy group-containing copolymer (BPSCl-Me) obtained from 5-2 and 40 mL of dichloromethane (DCM) as a solvent are added. Next, the reactor is immersed in a cooling bath so that the external temperature of the reactor may be 0° C. Under this condition, 7 mL of 1.0M $BBr_3$ solution is added dropwise thereto by using a syringe. After the completion of the addition of the $BBr_3$ solution, reaction is carried out for 6 hours to perform demethylation, and the reaction mixture is filtered without a dipping process and washed with distilled water many times. Then, the reaction mixture is agitated in boiling water at 100° C. for 24 hours to remove the residual $BBr_3$ and to hydrolyze sulfonyl chloride groups to be reduced into sulfonate groups. After filtering, the reaction product is dried in a vacuum oven at 60° C. for 24 hours to obtain a hydroxyl group-containing sulfonated copolymer. The resultant copolymer has a sulfonation degree of 40% and a hydroxylation degree of 40%.

[Reaction Scheme 3]

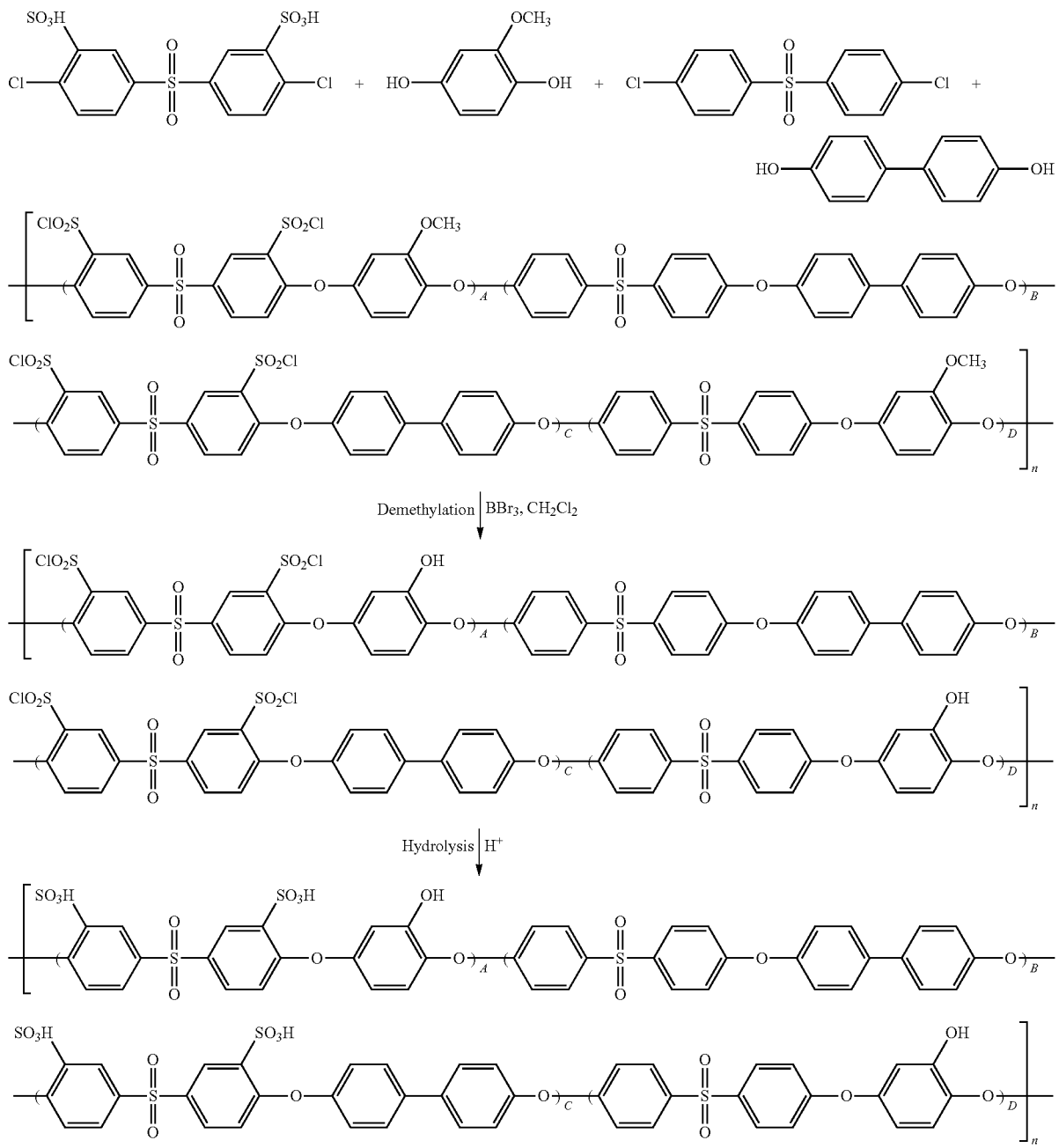

Examples 1-3. Preparation of Polymer Blend Electrolyte Membrane

The copolymers according to Preparation Examples 1-5 are used to obtain polymer blend electrolyte membranes.

Each of the copolymers according to Preparation Examples 1-5 is dissolved into dimethylacetamide (DMAc) as a solvent at room temperature, and blended according to the composition as shown in the following Table 2 to obtain a polymer solution. The polymer solution is cast onto a glass plate and dried in an oven at 60° C. for 24 hours, at 80° C. for 4 hours and at 120° C. for 24 hours to obtain a membrane having a thickness of about 50 μm. The dried membrane is immersed in distilled water to remove the residual solvent, separated from the glass plate, treated with water, boiled in 1M sulfuric acid solution at 80° C. for 2 hours and in distilled water at 80° C. for 2 hours to carry out conversion into a proton form.

TABLE 2

| (Wt %) | Example 1 Blend 40-622 | Example 2 Blend 50-721 | Example 3 Blend 60-811 |
|---|---|---|---|
| Preparation Example 1 (Sulfonated copolymer, sulfonation degree 40%) | 60 | 0 | 0 |
| Preparation Example 2 (Sulfonated copolymer, sulfonation degree 50%) | 0 | 70 | 0 |
| Preparation Example 3 (Sulfonated copolymer, sulfonation degree 60%) | 0 | 0 | 80 |
| Preparation Example 4 (hydroxyl group-containing copolymer, hydroxylation degree 60%) | 20 | 20 | 10 |
| Preparation Example 5 (Hydroxyl group-containing sulfonated copolymer, sulfonation degree 40%, hydroxylation degree 40%) | 20 | 10 | 10 |

Comparative Examples 1-6. Preparation of Electrolyte Membrane

The electrolyte membranes of Comparative Examples are obtained in the same manner as Examples, except that the compositions of polymer solutions are changed as shown in the following Table 3.

TABLE 3

| (Wt %) | Comparative Examples | | | | | |
|---|---|---|---|---|---|---|
| | 1 BPS40 | 2 BPS60 | 3 Blend 60-820 | 4 Blend 60-802 | 5 Blend 60-910 | 6 Blend 60-901 |
| Preparation Example 1 (Sulfonated copolymer, sulfonation degree 40%) | 100 | 0 | 0 | 0 | 0 | 0 |
| Preparation Example 2 (Sulfonated copolymer, sulfonation degree 50%) | 0 | 0 | 0 | 0 | 0 | 0 |
| Preparation Example 3 (Sulfonated copolymer, sulfonation degree 60%) | 0 | 100 | 80 | 80 | 90 | 90 |
| Preparation Example 4 (Hydroxyl group-containing copolymer, hydroxylation degree 60%) | 0 | 0 | 20 | 0 | 10 | 0 |
| Preparation Example 5 (Hydroxyl group-containing sulfonated copolymer, sulfonation degree 40%, hydroxylation degree 40%) | 0 | 0 | 0 | 20 | 0 | 10 |

Test Example 1. Evaluation of Appearance

To carry out transmission electron microscopy (TEM) (JEOL, 200 kV), each of the electrolyte membranes according to Examples and Comparative Examples is molded with epoxy, and then the section is sliced into about 50 nm and dyed with lead ions to carry out TEM. TEM images are obtained by operating a system of Tecnai G2 gun type at an accelerated voltage of 200 kV. The resultant images are shown in FIG. 1. In FIG. 1, NR212 represents the TEM image of a Nafion membrane.

In the results of FIG. 1, Nafion 212 membrane shows a phase-separated morphology in which hydrophilic domains are interconnected. Such a fine phase-separated structure may be required for excellent proton conductivity, particularly under a low-humidity condition. The electrolyte membrane according to Comparative Example 2 (BPS60) does not show a clearly phase-separated morphology due to the random copolymer, even though it has a high sulfonation degree of 60%. Examples 3 (60-811) shows a morphology in which small hydrophilic domains having a diameter of about 50-80 nm are further phase-separated in the form of spots in a large hydrophilic domain having a diameter of about 1 μm. Such a morphology in which hydrophilic domains and hydrophobic domains are finely phase-separated is one that can be observed in a conventional sulfonated block copolymer, and provides high proton conductivity under a low-humidity condition.

Comparative Example 3 (60-820) shows hydrophilic domains having a diameter of about 2-3 μm, and Comparative Example 5 (60-910) shows hydrophilic domains having a diameter of about 0.5-1 μm. Comparative Examples 2 and 6 (60-802, 60-901) containing no hydroxyl group-containing copolymer shows a smaller volume of phase-separated domains as compared to Comparative Example 3 and 5.

Test Example 2. Evaluation of Dimensional Stability

Each of the electrolyte membranes according to Examples and Comparative Examples having a size of width×length of 3×3 mm is dried at 80° C. for 24 hours and determined for weight ($m_d$) and length ($l_d$) in its dried state. The length of a membrane is the average of the lengths of the four sides of a quadrangle. Each electrolyte membrane is dipped in water at a temperature of 30° C. and 65° C. until it reaches an equilibrium state, and then determined for weight ($m_w$) and length ($l_w$) in its wet state. The water content (WU) and dimensional variation are calculated according to the Formulae 1 and 2, and the results are shown in FIG. 2A, FIG. 2B, FIG. 3A, FIG. 3B and FIG. 3C.

Water content($WU$,%)=($m_w$−$m_d$)/$m_d$×100      [Formula 1]

Dimensional variation (%)=($l_w$−$l_d$)/$l_d$×100      [Formula 2]

In the results of FIG. 2A, FIG. 2B, FIG. 3A, FIG. 3B and FIG. 3C, Comparative Example 2 (BPS60) shows a water content more than 304% and a dimensional variation of 210% in a hydrated state at 65° C. It is thought that a high sulfonation degree causes excessively high hydrophilicity.

On the contrary, the electrolyte membrane according to Example 3 (60-811) shows a water content significantly decreased by about 70% or more as compared to Comparative Example 2, while maintaining a high sulfonation degree (60%).

Test Example 3. Evaluation of Tensile Strength and Elongation

Figure 4:
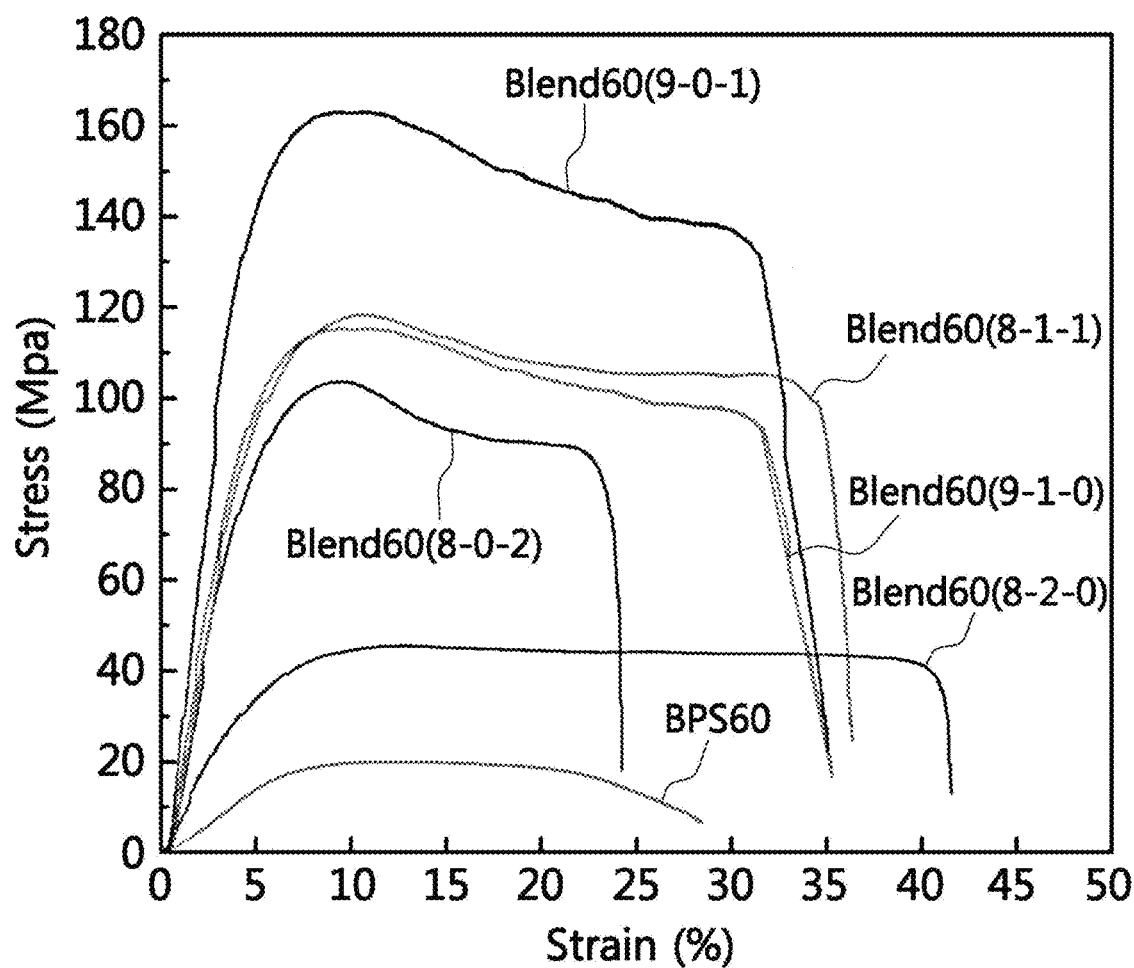
FIG. 4 is a graph illustrating the tensile strength and elongation of the electrolyte membranes according to Example and Comparative Example.

Each of the electrolyte membranes according to Examples and Comparative Examples is used to determine its tensile strength (MPa) and elongation (%) according to International Standard ISO 37-4 by using a multi-functional tester (Shimazu, AGS-500 NJ) at 25° C. under a humidity of 25% RH. The results are shown in FIG. 4. In the results of FIG. 4, the electrolyte membrane according to Example 3 (60-811) shows significantly increased tensile strength and elongation as compared to Comparative Example 2. Comparative Example 4 (60-802) shows low tensile strength and elongation. As can be seen from FIG. 1 illustrating the TEM results of Test Example 1, the membrane is torn around the phase-separated region, suggesting that the membrane has low physical strength.

Examples 4-6 and Comparative Examples 7-11. Preparation of Membrane-Electrode Assembly A membrane-electrode assembly (MEA) is obtained by a carbon coated membrane (CCM) process using spraying. The catalyst slurry for use in spraying is formed by dispersing 45 wt % of Pt/C (BASF fuel cells, Sommerset, N.J., USA) and 5 wt % of Nafion dispersion (DE 521, DuPont, Wilmington, Del., USA) into a mixture of isopropanol (IPA) with water. The formed catalyst slurry is coated directly onto each of the electrolyte membranes according to Examples 1-3 and Comparative Example 3-6 and Nafion membrane by using a spraying device as shown in the following Table 4. The amount of the finally coated platinum catalyst is 0.4 mg/cm² at each of cathode and anode. The resultant membrane-electrode assembly is dried in an oven at 60° C. for about 1 hour.

Test Example 4. Evaluation of Unit Cell Quality

A unit cell test is carried out under a high-humidity condition (temperature 65° C., relative humidity 95% RH) and a high-temperature low-humidity condition (90° C., 35% RH) by using hydrogen and air gas. The hydrogen and air are injected at a stoichiometric ratio of 1.5:2.0. Each unit cell is activated and evaluated for short-term quality by determining a polarization curve. The results are shown in FIG. 5 to FIG. 7.

Figure 5:
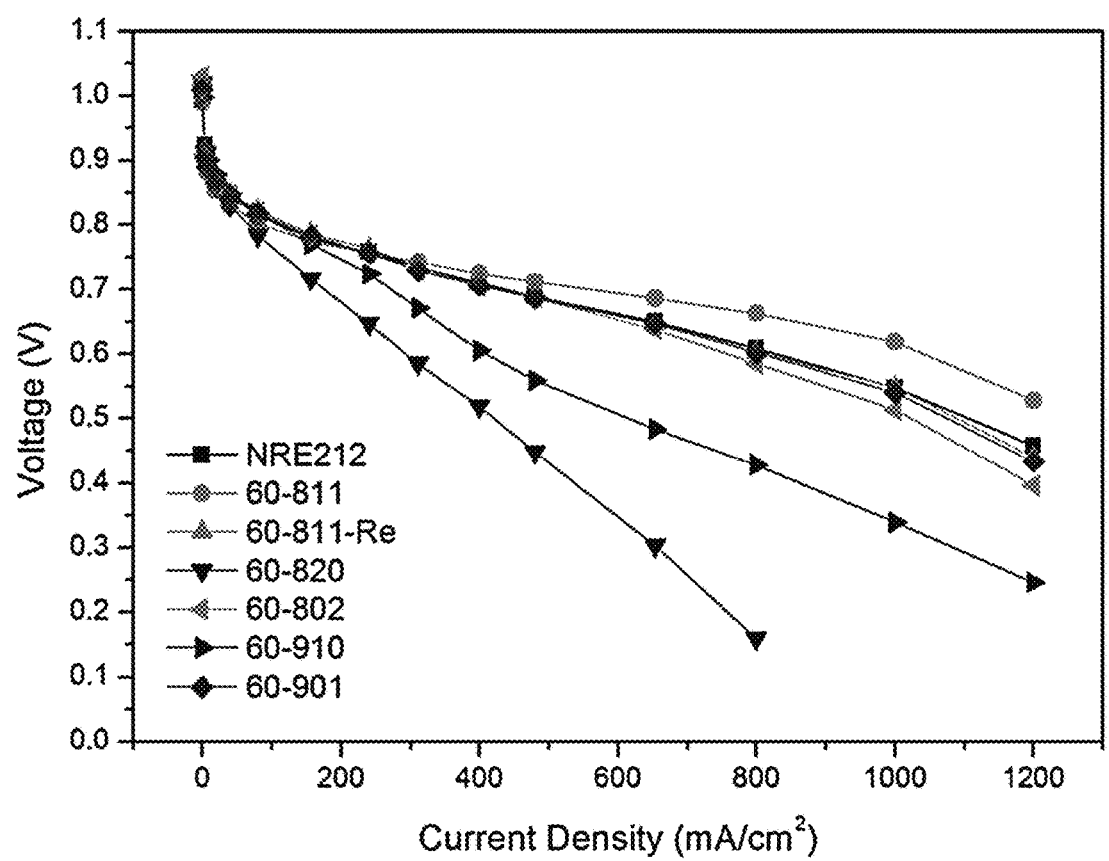
FIG. 5 is a graph illustrating the quality of a unit cell under a high-humidity condition of a relative humidity (RH) of 95% at 65° C.
Figure 6:
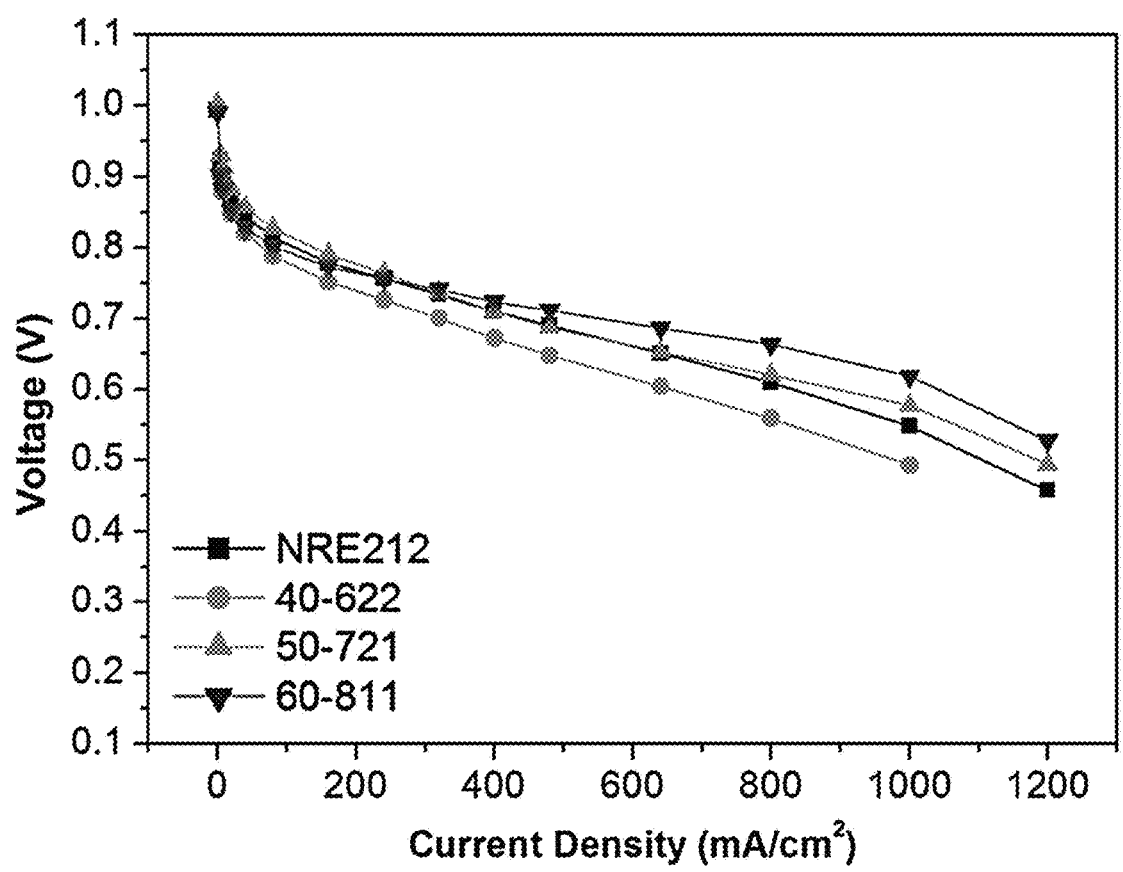
FIG. 6 is a graph illustrating the quality of a unit cell under a high-humidity condition of 95% RH at 65° C.

In the results of FIG. 5 and FIG. 6, each of Example 4 (40-622) and Example 5 (50-721) shows significantly high unit cell quality under a high-humidity condition of 65° C. and 95% RH. Particularly, Example 6 (60-811) shows a current density of about 1039 mA/cm² at 0.6 V, suggesting that it shows higher unit cell quality as compared to about 831 mA/cm² of Comparative Example 7 (NR-212) using a Nafion membrane. On the contrary, each of Comparative Examples 8 and 10 using an electrolyte membrane including no hydroxyl group-containing sulfonated copolymer shows significantly low unit cell quality. It is thought that the hydroxyl group of the hydroxyl group-containing copolymer in the polymer blend of the electrolyte membrane in the case each of Comparative Examples 8 and 10 forms hydrogen bonding with the sulfonate group of the sulfonated copolymer, resulting in a significant decrease in number of sulfonate groups capable of conducting proton.

Figure 7:
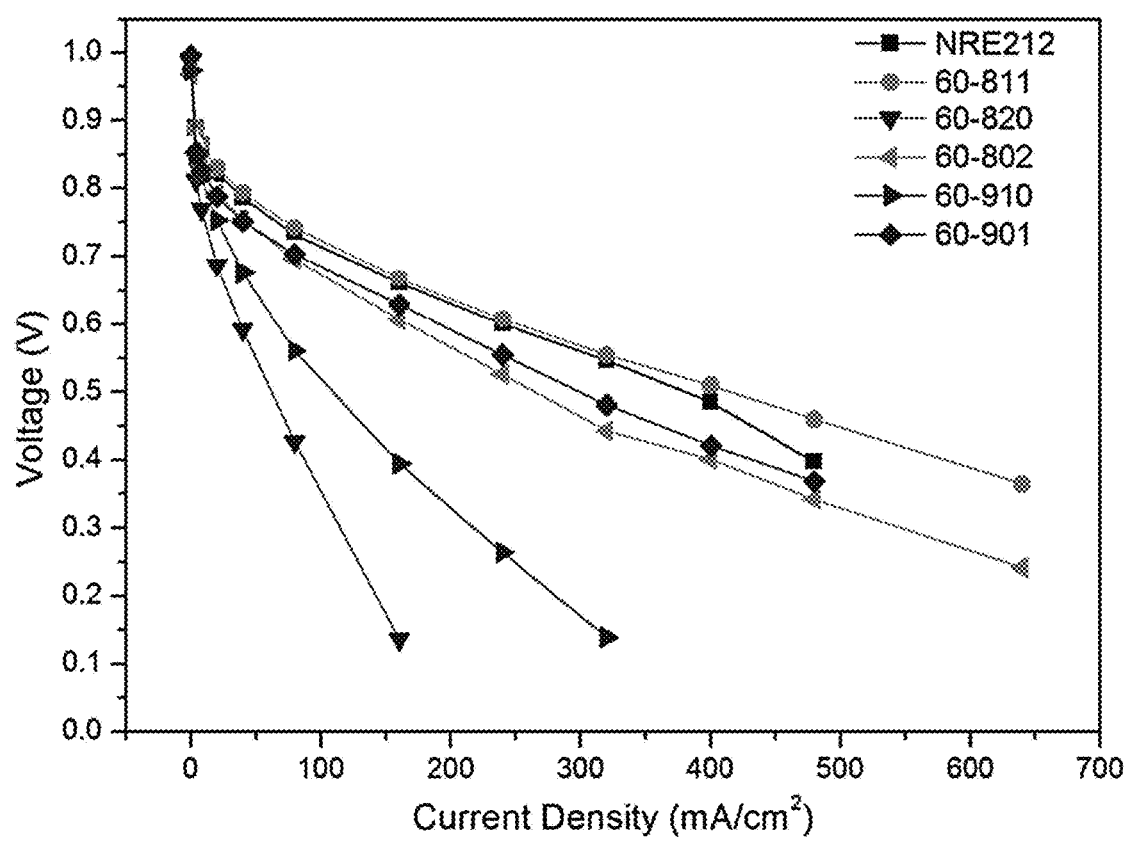
FIG. 7 is a graph illustrating the quality of a unit cell under a high-temperature low-humidity condition of 35% RH at 90° C.

In the results of FIG. 7, it can be seen that Example 6 (60-811) shows higher quality as compared to Comparative Example 7 even under a high-temperature low-humidity condition of 90° C. and 35% RH. It is thought that the electrolyte membrane according to an embodiment of the present disclosure shows a phase-separated morphology in which smaller hydrophilic domains are present in a larger hydrophilic domain, and thus shows such high cell quality.

Test Example 5. Evaluation of Long-Term Stability

Each of the membrane-electrode assemblies according to Examples 4-6 is used to carry out evaluation of long-term stability including evaluation of deterioration of physical properties and deterioration of chemical properties at the same time. Particularly, $H_2$ and air are injected to an anode and a cathode, respectively, and a cycling test is carried out at an open circuit voltage (OCV) for 1 minute, under a non-humidified condition at 0.6V for 1 minute, under a condition of 95% RH at 0.4V for 1 minute, and under a condition of 95% RH for total 3 minutes. The results are shown in FIG. 8.

Figure 8:
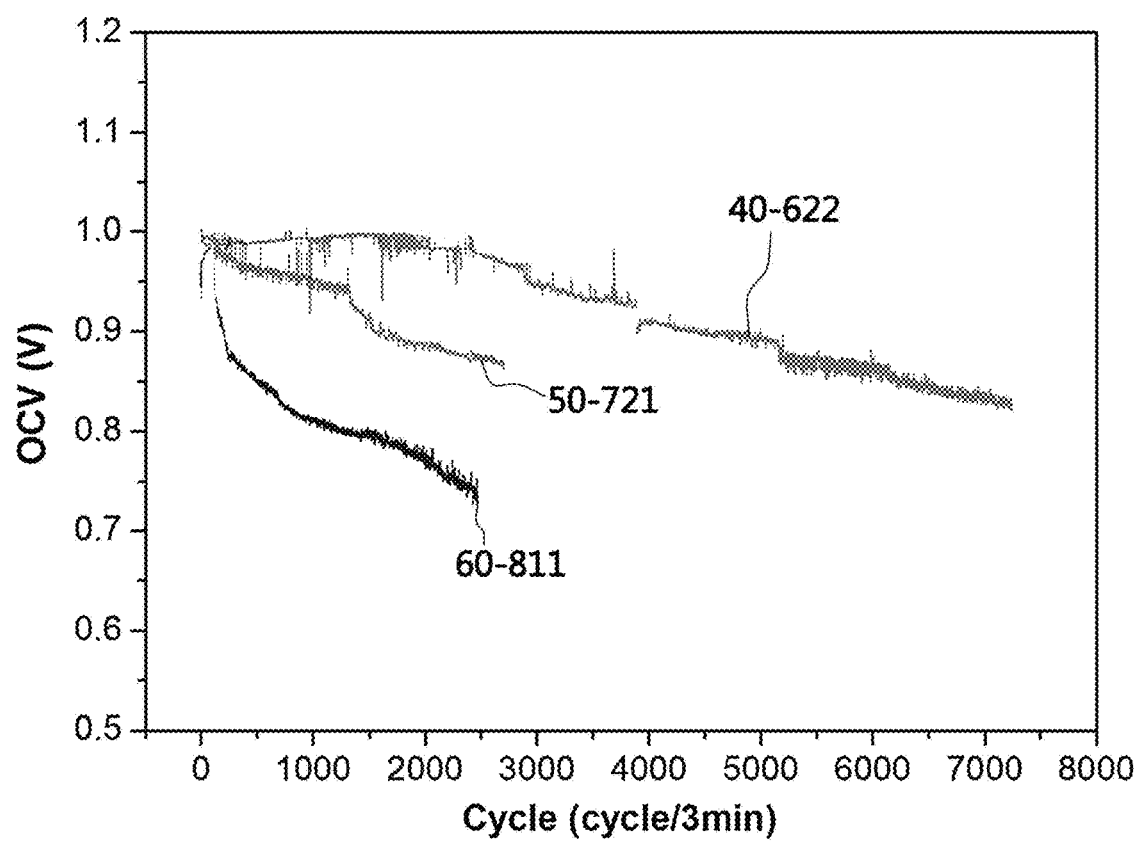
FIG. 8 is a graph illustrating the evaluation results of the long-term stability of the electrolyte membrane according to Example.

In the results of FIG. 8, based on an OCV quality drop of 0.9V, Example 4 (40-622) shows the highest long-term stability corresponding to about 6500 cycles on the basis of an OCV quality drop of 0.9V, Example 5 (50-721) shows long term-stability of about 1800 cycles, and the blend membrane of Example 6 (60-811) shows long-term stability of about 500 cycles.

TABLE 4

| | Examples | | | Comparative Examples | | | | |
|---|---|---|---|---|---|---|---|---|
| | 4 | 5 | 6 | 7 | 8 | 9 | 10 | 11 |
| Electrolyte membrane | Ex. 1 (40-622) | Ex. 2 (50-721) | Ex. 3 (60-811) | Nafion (NR-212) | Comp. Ex. 3 (60-820) | Comp. Ex. 4 (60-802) | Comp. Ex. 5 (60-910) | Comp. Ex. 6 (60-901) |

Many modifications can be made to adapt a particular situation or material to the teachings of the present disclosure without departing from the essential scope thereof. Therefore, it is intended that the present disclosure will include all embodiments falling within the scope of the appended claims.

What is claimed is:

1. An electrolyte membrane for a fuel cell comprising a polymer blend of (a) a sulfonated polyethersulfone copolymer, (b) a hydroxyl group-containing polyethersulfone copolymer and (c) a hydroxyl group-containing sulfonated polyethersulfone copolymer, wherein (a) the sulfonated polyethersulfone copolymer comprises repeating units of the following Chemical Formula 1:

Chemical Formula 1

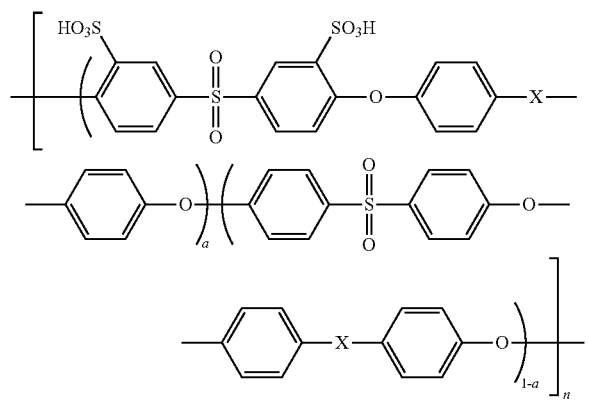

wherein X is O, S, C(=O), C(=O)NH, Si(CH$_3$)$_2$, (CH$_2$)$_p$, (CF$_2$)$_q$, C(CH$_3$)$_2$, C(CF$_3$)$_2$ or C(CH$_3$)(CF$_3$), each of p and q is an integer of 1-10, a is 0.1-0.95, and n is a polymerization degree of polymer which increases in proportion to the molecular weight of a copolymer.

2. The electrolyte membrane for a fuel cell according to claim 1, wherein (a) the sulfonated polyethersulfone copolymer has a sulfonation degree of 10%-95%.

3. The electrolyte membrane for a fuel cell according to claim 1, wherein (b) the hydroxyl group-containing polyethersulfone copolymer has a hydroxylation degree of 5%-90%.

4. The electrolyte membrane for a fuel cell according to claim 1, wherein (c) the hydroxyl group-containing sulfonated polyethersulfone copolymer has a sulfonation degree of 10%-95% and a hydroxylation degree of 5%-90%.

5. The electrolyte membrane for a fuel cell according to claim 1, wherein (a) the sulfonated polyethersulfone copolymer is present in an amount of at least 10 wt % and less than 100 wt % based on the total weight of the polymer blend.

6. The electrolyte membrane for a fuel cell according to claim 1, wherein (b) the hydroxyl group-containing polyethersulfone copolymer is present in an amount more than 0 wt % and less than 50 wt % based on the total weight of the polymer blend.

7. The electrolyte membrane for a fuel cell according to claim 1, wherein (c) the hydroxyl group-containing sulfonated polyethersulfone copolymer is present in an amount more than 0 wt % and less than 50 wt % based on the total weight of the polymer blend.

8. An electrolyte membrane for a fuel cell comprising a polymer blend of (a) a sulfonated polyethersulfone copolymer, (b) a hydroxyl group-containing polyethersulfone copolymer and (c) a hydroxyl group-containing sulfonated polyethersulfone copolymer, wherein (a) the sulfonated polyethersulfone copolymer, (b) the hydroxyl group-containing polyethersulfone copolymer and (c) the hydroxyl group-containing sulfonated polyethersulfone copolymer are present at a weight ratio (a):(b):(c) of 5-9:0.5-4:0.5-4.

9. The electrolyte membrane for a fuel cell according to claim 8, wherein (a) the sulfonated polyethersulfone copolymer, (b) the hydroxyl group-containing polyethersulfone copolymer and (c) the hydroxyl group-containing sulfonated polyethersulfone copolymer are present at a weight ratio (a):(b):(c) of 6:2:2, when (a) the sulfonated polyethersulfone copolymer has a sulfonation degree of 40%.

10. The electrolyte membrane for a fuel cell according to claim 8, wherein (a) the sulfonated polyethersulfone copolymer, (b) the hydroxyl group-containing polyethersulfone copolymer and (c) the hydroxyl group-containing sulfonated polyethersulfone copolymer are present at a weight ratio (a):(b):(c) of 7:2:1, when (a) the sulfonated polyethersulfone copolymer has a sulfonation degree of 50%.

11. The electrolyte membrane for a fuel cell according to claim 8, wherein (a) the sulfonated polyethersulfone copolymer, (b) the hydroxyl group-containing polyethersulfone copolymer and (c) the hydroxyl group-containing sulfonated polyethersulfone copolymer are present at a weight ratio (a):(b):(c) of 8:1:1, when (a) the sulfonated polyethersulfone copolymer has a sulfonation degree of 60%.

12. The electrolyte membrane for a fuel cell according to claim 8, wherein the copolymers of (a), (b) and (c) are poly(arylene ether sulfone)-based random copolymers.

13. An electrolyte membrane for a fuel cell comprising a polymer blend of (a) a sulfonated polyethersulfone copolymer, (b) a hydroxyl group-containing polyethersulfone copolymer and (c) a hydroxyl group-containing sulfonated polyethersulfone copolymer, wherein (b) the hydroxyl group-containing polyethersulfone copolymer comprises repeating units of the following Chemical Formula 2:

Chemical Formula 2

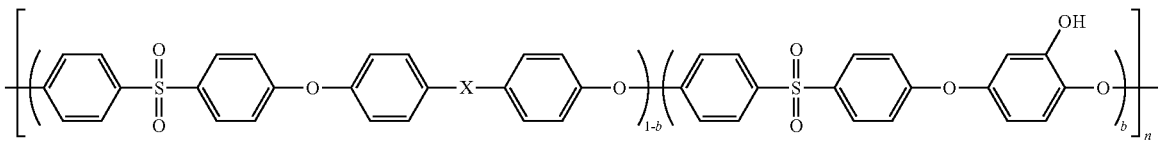

wherein X is O, S, C(=O), C(=O)NH, Si(CH$_3$)$_2$, (CH$_2$)$_p$, (CF$_2$)$_q$, C(CH$_3$)$_2$, C(CF$_3$)$_2$ or C(CH$_3$)(CF$_3$), each of p and q is an integer of 1-10, b is 0.05-0.9, and n is a polymerization degree of polymer which increases in proportion to the molecular weight of a copolymer.

14. The electrolyte membrane for a fuel cell according to claim 1, wherein (c) hydroxyl group-containing sulfonated polyethersulfone copolymer comprises repeating units of the following Chemical Formula 3:

Chemical Formula 3

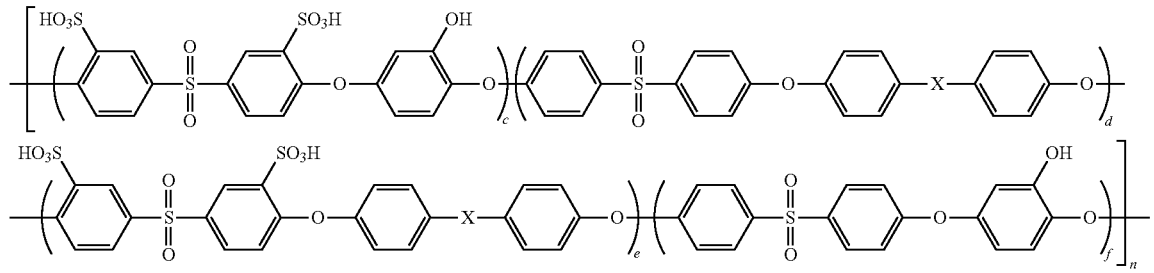

wherein X is O, S, C(=O), C(=O)NH, Si(CH$_3$)$_2$, (CH$_2$)$_p$, (CF$_2$)$_q$, C(CH$_3$)$_2$, C(CF$_3$)$_2$ or C(CH$_3$)(CF$_3$), each of p and q is an integer of 1-10, each of c, d, e and f corresponds to the molar ratio of the monomers for polycondensation, and n is a polymerization degree of polymer which increases in proportion to the molecular weight of a copolymer.

15. An electrolyte-membrane assembly comprising the electrolyte membrane for a fuel cell as defined in claim 1.

16. A fuel cell comprising the electrolyte membrane for a fuel cell as defined in claim 1.

17. An electrolyte-membrane assembly comprising the electrolyte membrane for a fuel cell as defined in claim 8.

18. An electrolyte-membrane assembly comprising the electrolyte membrane for a fuel cell as defined in claim 13.

19. An electrolyte-membrane assembly comprising the electrolyte membrane for a fuel cell as defined in claim 14.

20. A fuel cell comprising the electrolyte membrane for a fuel cell as defined in claim 8.

21. A fuel cell comprising the electrolyte membrane for a fuel cell as defined in claim 13.

22. A fuel cell comprising the electrolyte membrane for a fuel cell as defined in claim 13.

23. The electrolyte membrane for a fuel cell according to claim 8, wherein (a) the sulfonated polyethersulfone copolymer has a sulfonation degree of 10%-95%.

24. The electrolyte membrane for a fuel cell according to claim 8, wherein (b) the hydroxyl group-containing polyethersulfone copolymer has a hydroxylation degree of 5%-90%.

25. The electrolyte membrane for a fuel cell according to claim 8, wherein (c) the hydroxyl group-containing sulfonated polyethersulfone copolymer has a sulfonation degree of 10%-95% and a hydroxylation degree of 5%-90%.

26. The electrolyte membrane for a fuel cell according to claim 8, wherein (a) the sulfonated polyethersulfone copolymer is present in an amount of at least 10 wt % and less than 100 wt % based on the total weight of the polymer blend.

27. The electrolyte membrane for a fuel cell according to claim 8, wherein (b) the hydroxyl group-containing polyethersulfone copolymer is present in an amount more than 0 wt % and less than 50 wt % based on the total weight of the polymer blend.

28. The electrolyte membrane for a fuel cell according to claim 8, wherein (c) the hydroxyl group-containing sulfonated polyethersulfone copolymer is present in an amount more than 0 wt % and less than 50 wt % based on the total weight of the polymer blend.

29. The electrolyte membrane for a fuel cell according to claim 13, wherein (a) the sulfonated polyethersulfone copolymer has a sulfonation degree of 10%-95%.

30. The electrolyte membrane for a fuel cell according to claim 13, wherein (b) the hydroxyl group-containing polyethersulfone copolymer has a hydroxylation degree of 5%-90%.

31. The electrolyte membrane for a fuel cell according to claim 13, wherein (c) the hydroxyl group-containing sulfonated polyethersulfone copolymer has a sulfonation degree of 10%-95% and a hydroxylation degree of 5%-90%.

32. The electrolyte membrane for a fuel cell according to claim 13, wherein (a) the sulfonated polyethersulfone copolymer is present in an amount of at least 10 wt % and less than 100 wt % based on the total weight of the polymer blend.

33. The electrolyte membrane for a fuel cell according to claim 13, wherein (b) the hydroxyl group-containing polyethersulfone copolymer is present in an amount more than 0 wt % and less than 50 wt % based on the total weight of the polymer blend.

34. The electrolyte membrane for a fuel cell according to claim 13, wherein (c) the hydroxyl group-containing sulfonated polyethersulfone copolymer is present in an amount more than 0 wt % and less than 50 wt % based on the total weight of the polymer blend.

* * * * *